Jan. 18, 1966     J. L. SAMPSON     3,230,051
CLOSED-SYSTEM EVAPORATION CRYSTALLIZER
Filed Sept. 22, 1964
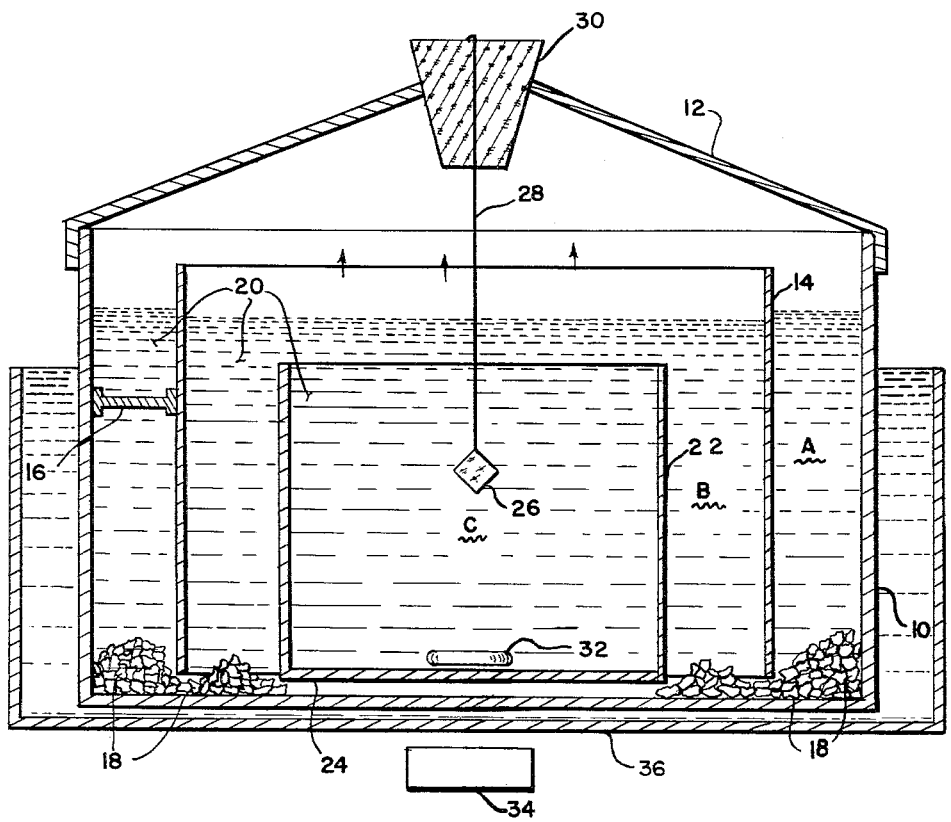
INVENTOR.
JOHN L. SAMPSON
BY
ATTORNEYS

United States Patent Office 3,230,051
Patented Jan. 18, 1966

3,230,051
CLOSED-SYSTEM EVAPORATION CRYSTALLIZER
John L. Sampson, Lexington, Mass., assignor to the United States of America as represented by the Secretary of the Air Force
Filed Sept. 22, 1964, Ser. No. 398,458
4 Claims. (Cl. 23—273)
(Granted under Title 35, U.S. Code (1952), sec. 266)

The invention described herein may be manufactured and used by or for the United States Government for governmental purposes without payment to me of any royalty thereon.

The invention relates to a closed-system crystallizer, and more particularly, to a new device and method for obtaining crystals from a solution.

In devices and techniques as currently used, reliance is very heavily upon diffusion for the transfer and motion of a solute.

The object of the present invention is the provision of a device wherein use is made, not only of the diffusion process, but wherein, diffusion, evaporation, condensation, gravity and hydrostatic pressure augment and reinforce each other to create in a closed-system a circulation which is self-perpetuating, continuous and automatic.

A further object of the invention is to effect crystal formation in a continuous closed system of substantially constant temperature, wherein a concentration gradient is maintained from low saturation to high saturation and supersaturation by a flow of solvent, the flow being brought about by combined action of evaporation, condensation, gravitation and hydrostatic pressure, and augmented by a baffle system which promotes the flow.

A further object of the invention is the provision of a closed system for the formation of crystals, wherein a concentration gradient is obtained by effecting a flow of solvent from low concentration to supersaturation wherein evaporation takes place in concentrated areas and wherein addition of pure solvent to less concentrated areas is brought about by the condensation of the product of this evaporation.

Further objects and advantages will appear as the description proceeds.

In the drawing, the figure is a cross-sectional view of the closed-system evaporation crystallizer.

Referring more in detail to the drawing, an outer closed container or receptacle 10 may be rectangular, cylindrical or of other desirable configuration and is designed for the containment of a solvent 20. The receptacle 10 is provided with a cover 12 which is maintained at a lower temperature than the rest of the system. This temperature differential may be accomplished by any suitable means such as applying heat to the receptacle 10 by its partial immersion in a warming bath 36, or by applying cooling means to the cover member 12.

The flow or circulation is set up in the system from an outer space or area A of low concentration through an intermediate area or space B of greater concentration of solute, to an inner space C where a condition of saturation and supersaturation is obtained.

This is effected by a system of concentric containers whose walls perform the function of baffles.

An open ended, intermediate tubular baffle member 14 is suspended within the tank 10 by any suitable means such as a spider support, one element of which is shown at 16. Its lower end is spaced from the floor of the tank 10, allowing liquid to pass freely along the base of the receptacle 10 and to flow through the nutrient material 18.

An inner vessel 22 may have a floor common with the floor of the receptacle 10. As it is shown in the drawing, the floor 24 of the vessel is spaced from the floor of the receptacle 10, allowing flow of solution under it.

It will be noted that when the system is functioning the level of the solution 20 will be below the upper open end of the baffle member 14, and that the space between the walls of the outer and inner receptacles is divided into outer space A and intermediate space B, having communication only at its lower end. It will be noted also that the inner receptacle 22 terminates, when the system is operating, below the level of the solution 20, so that flow can be established from the intermediate space A to the inner crystallizing space C.

A seed crystal 26 is suspended in the solute in the tank 22 by any suitable means, such as wire 28 secured to a removable block or cork element 30 insertable in the cover member 12.

An agitator 32 of any expedient construction is provided for movement of the liquid within the tank 22. As shown, the agitator 32 is a freely movable magnet, and is operated by a magnetic motor 34. Heat may be applied to the system in any expedient manner. A water bath 36 is shown in the drawing.

The operation of the device is as follows: a constant temperature is maintained throughout the system with the exception of the cover member 12 which is maintained by suitable means, as explained above, at a lower temperature than that maintained in the rest of the system. Evaporated solvent from the surface of the liquid in the system condenses on the inner surface of the cooled cover member 12. The drops of condensate, under the influence of gravity will follow the downwardly sloping inner surface of the cover member 12 and will enter the space A between the outer wall of the member 10 and the cylindrical member 14. This addition of evaporated and condensed solvent to the space A decreases the concentration of solute in this area and raises the level of the liquid in space A. Hydrostatic pressure is thus produced in this area and a downward movement of the liquid occurs as a result. Solvent from space A passes over and dissolves the nutrient material 18 and passes into the space B. Evaporation taking place from the surface of the solution defined by the walls 14, together with the replenishment in the area A due to condensation, tends to raise the level in space A so that a continual circulation is established, downward in space A, upward in space B and a condition of supersaturation will surround the seed crystal 26. An agitator 32 keeps the solution in motion. It will be seen that circulation of the liquid is maintained within the closed system by evaporation, condensation, gravitation, and hydrostatic pressure, without other aid than the temperature difference between the cover member 12 and the rest of the system.

It is an obvious characteristic of the system that all of the elements therein are stationary elements. With the exception of the magnetic agitator 32, there are no mechanical means applied for the raising and lowering of any liquid level anywhere throughout the system. The nutrient is placed in its proper position, the solvent added, and then the cover 12 is placed in position with the seed crystal material 26 depending therefrom. From then on the system is closed and the activity taking place within it, and the circulation established by the various means described herein, are self-sustaining and self-perpetuating. The only influence from outside the system is the cooling of the cover element 12, or the heating provided by the warming bath in the container 36. The use of either one without the other can be effective since the system operates because of a temperature differential and the only prerequisite condition is that the evaporation can take place from the surface of the liquid or solvent in the area B and about the liquid in the area C, and that condensation can take place when the vaporized material encounters the cooled surface of the cover 12.

Although the invention has been described with reference to a particular embodiment, it will be understood to those skilled in the art that the invention is capable of a variety of alternative embodiments within the spirit and scope of the appended claims; for example, the graded areas from substantially pure solvent to the area of saturation and supersaturation may be placed side-by-side instead of in concentric relationship.

I claim:

1. A device for promoting the formation of crystals, said device being a closed-system wherein evaporation, condensation, gravity and hydrostatic pressure augment and reinforce each other to form a self-perpetuating and continuously operating system, said device comprising an inner open container for the containment of saturated and supersaturated solutions, and for accommodating a seed crystal; an outer closed container, said inner and outer containers being placed in concentric relationship; an intermediate, tube-like baffle member placed also in concentric relationship, and dividing the space between said inner and outer containers into an outer space and an intermediate space, a solvent in said system, said baffle member being suspended so that solvent may pass beneath its lower extreme end from the outer space to said intermediate space; nutrient material so placed that contact therewith by said solvent in circulation is accomplished, the level of the solution when the system is in operation being above the open upper extremity of said inner open container so that fluid may flow from said intermediate space to the inner space; a cover on said outer closed container, means for maintaining the temperature at said cover being maintained at a lower temperature than that maintained in the main portion of said system, said cover being of such configuration that vapor rising from the surface of said solution condenses on the inner surface of of said cover and flows thereon to return as pure solvent to the outer portion of said divided space, raising the level therein, creating a hydrostatic head and a downward flow in said portion, underneath said baffle member and upward in the inner portion of said divided space, said solution in the flow described increasing in concentration of solute from the outer to the inner crystallizer container.

2. In a closed-system evaporation crystallizer, a closed receptacle for the containment of a solvent, a solvent in said receptacle, an inner container open at its upper end and closed at its base and located in said receptacle for the containment of saturated and supersaturated solution and for the accommodation of seed crystal material, the upper extremity of said inner container being located below the level of the solvent in said tank, an intermediate tube-like baffle member open at both upper and lower extremities suspended in said tank, its upper open extremity rising above the level of the solvent in said tank thereby dividing the space between the wall of said inner container into concentric outer space A and intermediate space B, the lower extremity of said intermediate member terminating above the lower floor of said tank for allowing free circulation of solvent from space A to space B, nutrient material in said receptacle located so that solvent flowing from space A to space B flows therethrough, a cover for said receptacle with inner surface concave upward, its highest point located above said inner container, said cover being maintained at a lower temperature than that maintained throughout the body of the system so that evaporation taking place from the surface of said solution condenses on the interior surface of said cover, follows the contour of said cover, returning to said solvent in the outer area A, tending to create hydrostatic head and downward movement of solvent in area A and upward movement in area B, replenishing with solution the solvent lost by evaporation, and whereby the inner area of said solution becomes saturated and supersaturated, thus promoting crystal growth in said inner container.

3. In the device as claimed in claim 2, an agitator located in the area of greatest saturation, for agitating the solution in the area of the seed crystal.

4. In a closed-system evaporation crystallizer, a closed receptacle for the containment of a solvent, solvent in said receptacle, an inner open container located in said receptacle for the containment of saturated and supersaturated solution, and for the containment also of seed crystal material, the level of the solvent when the system is in operation being above the upper extremity of said inner container, an intermediate member open at both upper and lower extremities suspended in said receptacle, the level of solvent when the system is in operation being located below the upper extremity of said intermediate member and dividing the space between the wall of said receptacle and the wall of said inner container into outer area A and intermediate area B, the lower extremity of said intermediate member terminating above the lower floor of said receptacle for allowing free circulation of solvent from area A to area B, nutrient material in said receptacle, a cover for said receptacle of upwardly concave configuration, its highest point located above said inner container, said cover being maintained at a lower temperature than that maintained throughout the rest of the system so that vapor rising from the surface of the solution condenses on the interior surface of said cover, follows the contour of said cover, returning to said solvent in the outer area B, tending to create hydrostatic head whereby solvent travels downward in the nutrient and into the area B, upward in area B, replenishing the solvent lost by evaporation, and whereby the inner regions of said solution becomes saturated and supersaturated, thus promoting the growth of crystals in said inner container.

References Cited by the Examiner

UNITED STATES PATENTS

| | | | |
|---|---|---|---|
| 1,353,571 | 9/1920 | Dreibrodt | 23—273 X |
| 2,350,534 | 6/1944 | Resinger. | |
| 2,546,310 | 3/1951 | Kornei | 23—273 X |
| 2,647,043 | 7/1953 | Imber | 23—273 |
| 2,657,122 | 10/1953 | Chau Doye | 23—273 |
| 2,793,941 | 5/1957 | Estes | 23—273 |
| 3,088,716 | 5/1963 | Stott. | |
| 3,101,259 | 8/1963 | Sawyer | 23—301 X |

OTHER REFERENCES

Sampson et al.: June 1963, Improved Closed-System Evaporation Crystallizer Review of Scientific Instruments, vol. 34, #10; 10–63 pages (1150–1152).

NORMAN YUDKOFF, *Primary Examiner.*

G. HINES, *Assistant Examiner.*